United States Patent [19]
Dawson et al.

[11] Patent Number: 4,872,677
[45] Date of Patent: Oct. 10, 1989

[54] CROQUET BALL

[76] Inventors: Bryan J. Dawson, 1349 South Road, Bedford Park; Leonard J. Hill, 1 Mindara Court, Belair, both of Australia

[21] Appl. No.: 174,408

[22] Filed: Mar. 28, 1988

[30] Foreign Application Priority Data

Mar. 26, 1987 [AU] Australia ................................. PI1085

[51] Int. Cl.⁴ ............................................. A63B 37/00
[52] U.S. Cl. ............................. 273/58 A; 273/58 K; 273/DIG. 008; 273/58 J
[58] Field of Search ................... 273/DIG. 008, 58 J, 273/58 R, 58 A, 58 K, 60 B, 60 R, 63 R, 63 G, 128 R, 128 A

[56] References Cited
U.S. PATENT DOCUMENTS 3,976,295  8/1976  Heald ........................ 273/DIG. 008
3,979,126  9/1976  Dusbiber .................. 273/DIG. 008
4,454,253  6/1984  Murphy et al. ................... 273/58 J

OTHER PUBLICATIONS

Extract from *The Laws of Association Croquet and Golf Croquet* . . . , published by The Croquet Association, London, England, Fourth Ed., (1986), 2 pp. and title page.

Primary Examiner—Geroge J. Marlo
Attorney, Agent, or Firm—Cushman, Darby & Cushman

[57]  ABSTRACT

A croquet ball, comprising:
  a one-piece substantially spherical body which is externally knurled and entirely composed of cold-molded polyurethane including a widely distributed filler which provides said body with a weight of substantially 16 ounces, an external diameter of substantially 3.625 inches and a bounce, when dropped from a height of 60 inches onto a steel plate one inch thick and set rigidly in concrete, when the ambient temperature is 20° C., of:
about 43 inches, when the ball is at 20° C.,
about 43 inches when the ball is at 0° C., and
about 35 inches when the ball is a 100° C.

2 Claims, 1 Drawing Sheet

CROQUET BALL

BACKGROUND OF THE INVENTION

This invention relates to croquet balls.

In the playing of the game of croquet, there are required four balls each of the same dimensions and characteristics but each differently coloured.

International rules have been accepted for the playing of this game throughout the world which set the diameter, the weight, and the extent of rebound that must be required from each ball as well as the consistency between a set of balls which are used for a particular game.

Any ball must keep a close tolerance to these specifications over a significant range of temperatures both in respect of rebound and in respect of overall size.

The ball that is most conventionally used at the present time is manufactured by having as a composite, a cork innerpart and a surrounding plastic skin.

A number of difficulties arise with these existing style of balls the first of these being that they are found to be extremely expensive to purchase. The manufacturing technique has to be essentially manual including forming cork into a ball shape, and then coating this and having a knurled type finish around the external surface of the coating plastic.

Very significant difficulty lies with the problem that cork being a naturally occurring material is not essentially uniform in providing the required characteristics and there has to be therefore a high degree of selection when using cork for this purpose.

The next problem is that in manufacture, cork has to be cut into a totally round shape and then this has to be centrally located within a surrounding coating plastic.

In practice, it is extremely difficult to centrally locate this cork within the surrounding plastic meaning that some parts of the external plastic are somewhat thinner than others thereby giving an unwanted bias to the ball.

As this effect is essentially hidden to the user, this does not assist expert players in achieving skill based results.

Furthermore, in trials conducting with respect to existing balls, where these have been manufactured according to the technique described when these have been subjected to being immersed in boiling water for a relatively small period, it has been discovered that some of the internal materials expand excessively perhaps because of an infusion of water but the result is that the ball becomes grossly misshapen and, of course, becomes useless.

It has to be recalled that the game of croquet can be played in an outside venue in which even the shade temperatures can be in excess of 40 degrees centigrade so that a ball that cannot withstand such excessive temperatures does provide very significant difficulties to the players.

In an attempt to overcome these problems, it has been known to provide a ball manufactured entirely of a plastics material polypropylene.

The problem that has been experienced with such a ball is that using polypropylene as the material, requires that it be manufactured by injection moulding which means substantial heating of the plastics and this inherently, then, provides an external surface which will be subject to internal pressures which can build up during cooling and therefore the shape is prone to distortion.

Further, however, whereas it is preferred, at least for first class play, that a ball shall have an external knurled surface, experience has shown that if knurling is provided with a polypropylene material, under the normal conditions of playing of the game, the external knurling surface is very quickly flattened with the impact of a croquet mallet causing, therefore, flat spots and a ball which is very quickly, therefore, not uniform.

Accordingly, it has been considered that it is simply not viable to provide a knurled finish on such a ball so that, whereas polypropylene as a plastic is one of the few that would be appropriate from a specific gravity point of view, its impact resistance is not adequate except where it is comprised of a smooth external surface.

Such a ball is, accordingly, in use but only as a ball for less than expert players and where the players are not willing to pay for the better ball.

The problem, therefore, has been to find a croquet ball of a type and technique for manufacture of a croquet ball which will allow a ball to be manufactured which lies within specifications required in terms of bounce over a significant change in temperatures, has dimensional stability over such a range of temperatures, can withstand impact on a knurling external surface without significant long term damage, and finally be relatively economic in manufacture.

Within these criteria the material or materials must also provide for the combination of size and weight so that there must be an average specific gravity which must meet the specification requirement.

This then is the problem.

SUMMARY OF THE INVENTION

According to this invention there has been discovered, indeed, a plastic and a technique of manufacture which can provide a ball which can go a long way to solve the problems stated.

According to one form of this invention, although this need not necessarily be only or indeed the broadest form of this, there is, proposed a ball appropriate for playing the game of croquet, and which is comprised of polyurethane plastics material.

In preference, the polyurethane plastics material is of constant formulation and density throughout the ball.

in preference, the ball has a knurled external surface.

It is, in fact, quite surprising that polyurethane plastics material can be used for this purpose.

It is, of course, presumed that subsequent sizing will not be economic so that it becomes essential that the product, as cast, can be firstly very closely within the external dimensional tolerance and further, that the extent of eccentricity or distortion within the shape is kept to a minimum.

There are various techniques for moulding urethane type plastics a first being to raise the monomer material to a high temperature and cast the material at this high temperature.

The problem with this is not only the difficulty related to assessing the extent of change of dimension of the die during such heating procedures and cooling procedures, but that it becomes almost impossible to anticipate the extent to which some parts of the urethane material, once cast, will sustain internal compressive forces or will release these hence causing changes in shape during any heating or cooling which might naturally occur or, indeed, simply having a change of shape being caused by the compression forces releasing during the cooling process after casting.

There are, indeed, means by which the monomer materials can be catalysed and caused to cure without heating, but at least one of these includes a solvent which is found to significantly degrade the subsequent mechanical qualitites of the urethane to the extent that the material is nowhere near as impact resistant as would be desired.

The discovery is, in fact, that if one takes a material that is now available which is catalysed in such a way as not to be solvent-based, but which can still be cast using a cold casting technique, then it has been found that an adequate resultant product can be achieved.

In preference, the polyurethane plastics material is comprised of a plastics material which has been cold cast.

In preference, the plastics material comprised of polyurethane is manufactured from a monomer in which the catalyst is not solvent-based so that the resulting end urethane is not solvent degraded.

In preference, the ball is manufactured from a material which is available commercially and which is sold under the trade mark "Dorprene" from Dorlen Plastic and Rubber Engineering Co. Pty. Ltd. of 95 O'Sullivan Road, Lonsdale, State of South Australia.

A material sold under the designation "50D" provides an appropriate hardness.

One difficulty with this material, however, is that it is not precisely the correct specific gravity when cast for the purpose.

A further discovery has been tht one cannot use in the conventional way, inert fillers in order to alter the specific gravity, but it has been discovered that if a plasticiser is added such as a chlorinated paraffin typically that which is sold by ICI in Australia under the trade mark "Cereclor" and under the designating "50LV" and the quantity is added to the extent that the specific gravity is, indeed, appropriately altered then this overcomes the problem of matching the specific gravity with the resiliency requirement.

By inserting such material with the appropriate catalyst into a die which is appropriately shaped including a knurled surface to provide for a knurled finish ball shape, then simply allowing the material as a question of time to set and, indeed, cure will result in a ball appropriate for the application.

While some internal heating during the setting process will occur, it has been found in practice that this is relatively negligible and provided the material which is used is appropriate de-gassed and is appropriately kept in a de-gassed form, then such a simple setting and curing process is effective for the purpose.

DETAILED DESCRIPTION

Figure 1:
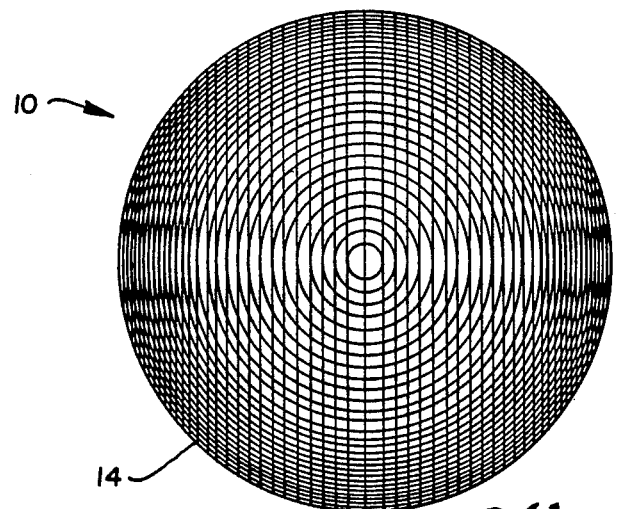
FIG. 1 is an elevation view of an externally knurled croquet ball provided in accordance with the principles of the present invention.
Figure 2:
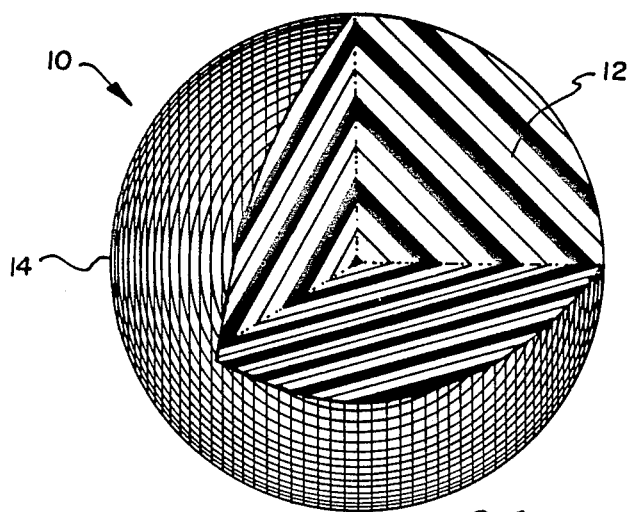
FIG. 2 is a partially cut-away perspective view thereof.

The drawing figures show a croquet ball 10 which is cold cast, entirely from the external surface to the center, of polyurethane plastics material 12 including chlorinated paraffin as a plasticizer. The external surface is knurled, as shown at 14.

In tests conducted on a ball manufactured according to the described process, specifically in relation to a bounce test at various temperatures it was noted that a representative example of this ball bounce, when dropped from a height of 60 inches onto a steel plate 1 inch thick and set rigidly in concrete, to 43 inches when ambient temperature and the temperature of the ball was 20 degrees centigrade. The tolerance offered in the association rules is between 30 inches and 45 inches.

When the ball itself was frozen although the ambient temperature remained at approximately 20 degrees centigrade, the bounce still remained at 43 inches.

When the temperature of the ball was raised to 100 degrees centigrade once again keeping the ambient temperature at 20 degrees centigrade, the bounce reduced to 35 inches.

This compares with the previous expensive cork and plastics composite ball in which bounce was identical for 20 degrees centigrade and frozen at 37½ inches but the ball was destroyed during the heating to boiling temperature.

An interesting comparison is the smooth surface polypropylene ball wherein the 20 degrees centigrade bounce test was at 37½ inches, frozen it rose to 43 inches and returned at boiling temperature to 36 inches.

In the preferred example, a croquet ball is made so as to have a diameter of 3⅝ inches and of a weight of 16 ounces and accordingly such a ball is manufactured by insertion of a catalysed monomer comprised substantially of materials which will form polyurethane plastics material, the die being a two part die and having an appropriate internal surface to provide for a knurled finish on the surface on the ball, there being means to subject the material to a substantive pressure once inserted within the two part die.

The material is indeed that which is supplied commercially in Australia under the trade mark "Dorprene" and which is available as previously disclosed, and the steps in preparing this material for insertion to the die where those as disclosed on the material as it is provided commercially subject to the additive of plasticiser.

No temperature apart from any internal thermal build up from the polymerization process was required and the material was left to set so that after approximately 2 hours while within a ambient of 20 degrees centigrade, the two part die was separated, the plastics having sufficient resilience to allow for otherwise interlocking shapes effecting the knurling surface of the then moulded product, and the ball is then allowed to fully cure before being used for playing purposes.

The resultant ball has been found to be extremely stable over a wide range of temperatures, substantially impact resistant so that it will not over a substantial period of time develop flat spots even with prominent knurling and because it can be formed with very accurate sizing using cold casting techniques, it can be economically manufactured and supplied.

We claim:

1. A croquet ball, comprising:
    a one-piece substantially spherical body entirely composed of cold-molded polyurethane including a widely distributed filler which provides said body with a weight of substantially 16 ounces, an external diameter of substantially 3.625 inches and a bounce, when dropped from a height of 60 inches onto a steel plate one inch thick and set rigidly in concrete, when the ambient temperature is 20° C., of:
    about 43 inches, when the ball is at 20° C.,
    about 43 inches when the ball is at 0° C., and
    about 35 inches when the ball is at 100° C.
2. The croquet ball of claim 1, wherein:
    said one-piece substantially spherical body is externally knurled.

* * * * *